United States Patent
Tannous et al.

(10) Patent No.: US 8,719,785 B2
(45) Date of Patent: *May 6, 2014

(54) DETERMINING RELEASE DIFFERENCES

(75) Inventors: Samuel Joseph Tannous, Penshurst (AU); Troy Andrew Astle, Stanmore (AU); David de Vos, Lane Cove (AU)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/430,870

(22) Filed: Mar. 27, 2012

(65) Prior Publication Data

US 2012/0284693 A1 Nov. 8, 2012

Related U.S. Application Data

(63) Continuation of application No. 13/101,677, filed on May 5, 2011.

(51) Int. Cl.
*G06F 9/45* (2006.01)

(52) U.S. Cl.
USPC ............ 717/121; 717/106; 717/116; 717/120

(58) Field of Classification Search
None
See application file for complete search history.

(56) References Cited

U.S. PATENT DOCUMENTS

| 5,481,722 | A | * | 1/1996 | Skinner | 717/122 |
| 5,574,898 | A | * | 11/1996 | Leblang et al. | 1/1 |
| 6,594,822 | B1 | * | 7/2003 | Schweitz et al. | 717/140 |
| 2005/0028143 | A1 | * | 2/2005 | Aridor et al. | 717/122 |
| 2005/0216486 | A1 | * | 9/2005 | Barshefsky et al. | 707/100 |
| 2006/0117075 | A1 | * | 6/2006 | Cowan et al. | 707/203 |
| 2007/0234291 | A1 | * | 10/2007 | Ronen et al. | 717/120 |
| 2010/0146484 | A1 | * | 6/2010 | Advani | 717/121 |

OTHER PUBLICATIONS

Steinholtz et al., "Automatic Identification of Software System Differences," Software Engineering, IEEE Transactions on Issue Date: Apr. 1987, vol. SE-13/Issue: 4, pp. 493-497.
Kruskal et al., "Managing Multi-Version Programs with an Editor," IBM Journal of Research and Development, Issue Date: Jan. 1984, vol. 28/Issue: 1, pp. 74-81.
Maletic et al., "Supporting Source Code Difference Analysis," Software Maintenance, 2004, Proceedings 20th IEEE, International Conference on Publication, http://dx.doi.org/10.1109/ICSM.2004.1357805, Year: 2004, pp. 210-219.

(Continued)

*Primary Examiner* — Isaac Tecklu
(74) *Attorney, Agent, or Firm* — Holland & Knight LLP; Brian J. Colandreo, Esq.; Jeffrey T. Placker, Esq.

(57) ABSTRACT

A method, computer program product, and system for determining release differences is described. A method may comprise determining a first difference, the first difference corresponding to one or more activities that were at least one of: added to a main branch between a first release branch and a second release branch, and removed from the main branch between the first release branch and the second release branch. The method may further comprise determining a second difference, the second difference corresponding to one or more activities that were at least one of: added to the first release branch, and removed from the first release branch. The method may additionally comprise determining a third difference, the third difference corresponding to one or more activities that were at least one of: added to the second release branch, and removed from the second release branch. A delta activity set may be determined.

9 Claims, 8 Drawing Sheets

(56) References Cited

OTHER PUBLICATIONS

Ram et al., "Extracting Delta for Incremental Data Warehouse Maintenance," Data Engineering, 2000, Proceedings 16th International Conference on Publication, http://dx.doi.org/10.1109/ICDE.2000.839415, Year: 2000, pp. 220-229.

Cyrille Artho, "Iterative Delta Debugging," Hardware and Software: Verification and Testing Lecture Notes in Computer Science, 2009, http://www.springerlink.com/content/m9rkxt105975t1w6/Volume 5394/2009, pp. 99-113.

Schaefer et al., "Delta-Oriented Programming of Software Product Lines," Software Product Lines: Going Beyond Lecture Notes in Computer Science, 2010, http://www.springerlink.com/content/b7141306464528t8/Volume6287/2010, pp. 77-91.

* cited by examiner

DETERMINING RELEASE DIFFERENCES

RELATED APPLICATIONS

The subject application is a continuation application of U.S. patent application Ser. No. 13/101,677, filed 5 May 2011, the entire content of which is herein incorporated by reference.

BACKGROUND OF THE INVENTION

Software source code may be maintained in a source control system. The source control system may include a main branch, or trunk. The main branch or trunk may be branched out into one or more release branches, or release streams. Each release branch or release stream may include changes, or activities, maintained independent of the main branch, or trunk. As such, one or more release branches or release streams may include unique sets of changes or activities.

BRIEF SUMMARY OF THE INVENTION

In a first embodiment, a method may include determining, via one or more computing devices, a first difference. The first difference may correspond to one or more activities that were at least one of: added to a main branch between a first release branch and a second release branch, and removed from the main branch between the first release branch and the second release branch. The method may further include determining, via the one or more computing devices, a second difference. The second difference may correspond to one or more activities that were at least one of: added to the first release branch, and removed from the first release branch. The method may also include determining, via the one or more computing devices, a third difference. The third difference may correspond to one or more activities that were at least one of: added to the second release branch, and removed from the second release branch. The method may additionally include determining, via the one or more computing devices, a delta activity set. The delta activity set may correspond to one or more activities that were at least one of: included in the second release branch and not included in the first release branch, and included in the first release branch and not included in the second release branch. The delta activity set may be based upon, at least in part, the first difference, the second difference, and the third difference.

One or more of the following features may be included. The delta activity set may be the first difference minus the second difference, plus the third difference. The first difference, the second difference, and the third difference may be determined via one or more difference algorithms. The first release branch and the second release branch may be non-sequential release branches. The first release branch may include all activities included in the main branch until the first release branch. The second release branch may include all activities included in the main branch until the second release branch. The one or more activities may include at least one of a function, a subroutine, a method, a portion of code, a source code change, a change to a portion of code, a file change, a user interface change, a document change, and a database change. The main branch, the first release branch, and the second release branch may be configured via a software configuration management system.

In a second embodiment, a computer program product may reside on a computer readable storage medium and may have a plurality of instructions stored on it. When executed by a processor, the instructions may cause the processor to perform operations including determining a first difference. The first difference may correspond to one or more activities that were at least one of: added to a main branch between a first release branch and a second release branch, and removed from the main branch between the first release branch and the second release branch. The operations may further include determining a second difference. The second difference may correspond to one or more activities that were at least one of: added to the first release branch, and removed from the first release branch. The operations may also include determining a third difference. The third difference may correspond to one or more activities that were at least one of: added to the second release branch, and removed from the second release branch. The operations may additionally include determining a delta activity set. The delta activity set may correspond to one or more activities that were at least one of: included in the second release branch and not included in the first release branch, and included in the first release branch and not included in the second release branch. The delta activity set may be based upon, at least in part, the first difference, the second difference, and the third difference.

One or more of the following features may be included. The delta activity set may be the first difference minus the second difference, plus the third difference. The first difference, the second difference, and the third difference may be determined via one or more difference algorithms. The first release branch and the second release branch may be non-sequential release branches. The first release branch may include all activities included in the main branch until the first release branch. The second release branch may include all activities included in the main branch until the second release branch. The one or more activities may include at least one of a function, a subroutine, a method, a portion of code, a source code change, a change to a portion of code, a file change, a user interface change, a document change, and a database change. The main branch, the first release branch, and the second release branch may be configured via a software configuration management system.

In a third embodiment, a computing system is provided. The computing system may include at least one processor and at least one memory architecture coupled with the at least one processor. The computing system may also include a first software module executable by the at least one processor and the at least one memory architecture, wherein the first software module may be configured to determine a first difference. The first difference may correspond to one or more activities that were at least one of: added to a main branch between a first release branch and a second release branch, and removed from the main branch between the first release branch and the second release branch. Further, the computing system may include a second software module which may be configured to determine a second difference. The second difference may correspond to one or more activities that were at least one of: added to the first release branch, and removed from the first release branch. Additionally, the computing system may include a third software module which may be configured to determine a third difference. The third difference may correspond to one or more activities that were at least one of: added to the second release branch, and removed from the second release branch. Also, the computing system may include a fourth software module which may be configured to determine a delta activity set. The delta activity set may correspond to one or more activities that were at least one of: included in the second release branch and not included in the first release branch, and included in the first release branch and not included in the second release branch. The delta activity may be set based upon, at least in part, the first difference, the second difference, and the third difference.

One or more of the following features may be included. The delta activity set may be the first difference minus the second difference, plus the third difference. The first difference, the second difference, and the third difference may be determined via one or more difference algorithms. The first release branch and the second release branch may be non-sequential release branches. The first release branch may include all activities included in the main branch until the first release branch. The second release branch may include all activities included in the main branch until the second release branch. The one or more activities may include at least one of a function, a subroutine, a method, a portion of code, a source code change, a change to a portion of code, a file change, a user interface change, a document change, and a database change. The main branch, the first release branch, and the second release branch may be configured via a software configuration management system.

The details of one or more implementations are set forth in the accompanying drawings and the description below. Other features and advantages will become apparent from the description, the drawings, and the claims.

DETAILED DESCRIPTION OF THE INVENTION

Figure 1:
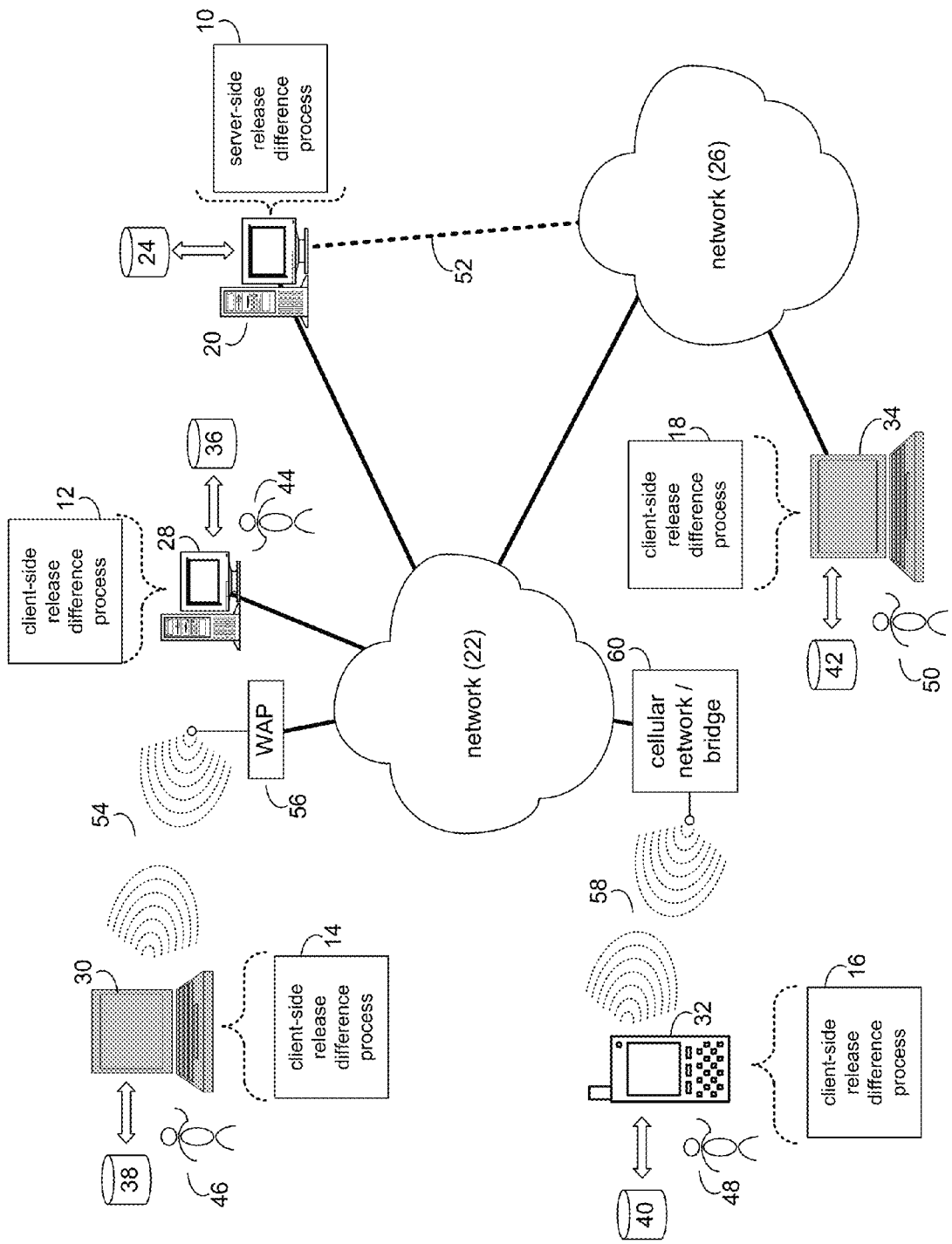
FIG. 1 is a diagrammatic view of a release difference process coupled to a distributed computing network.
Figure 2:
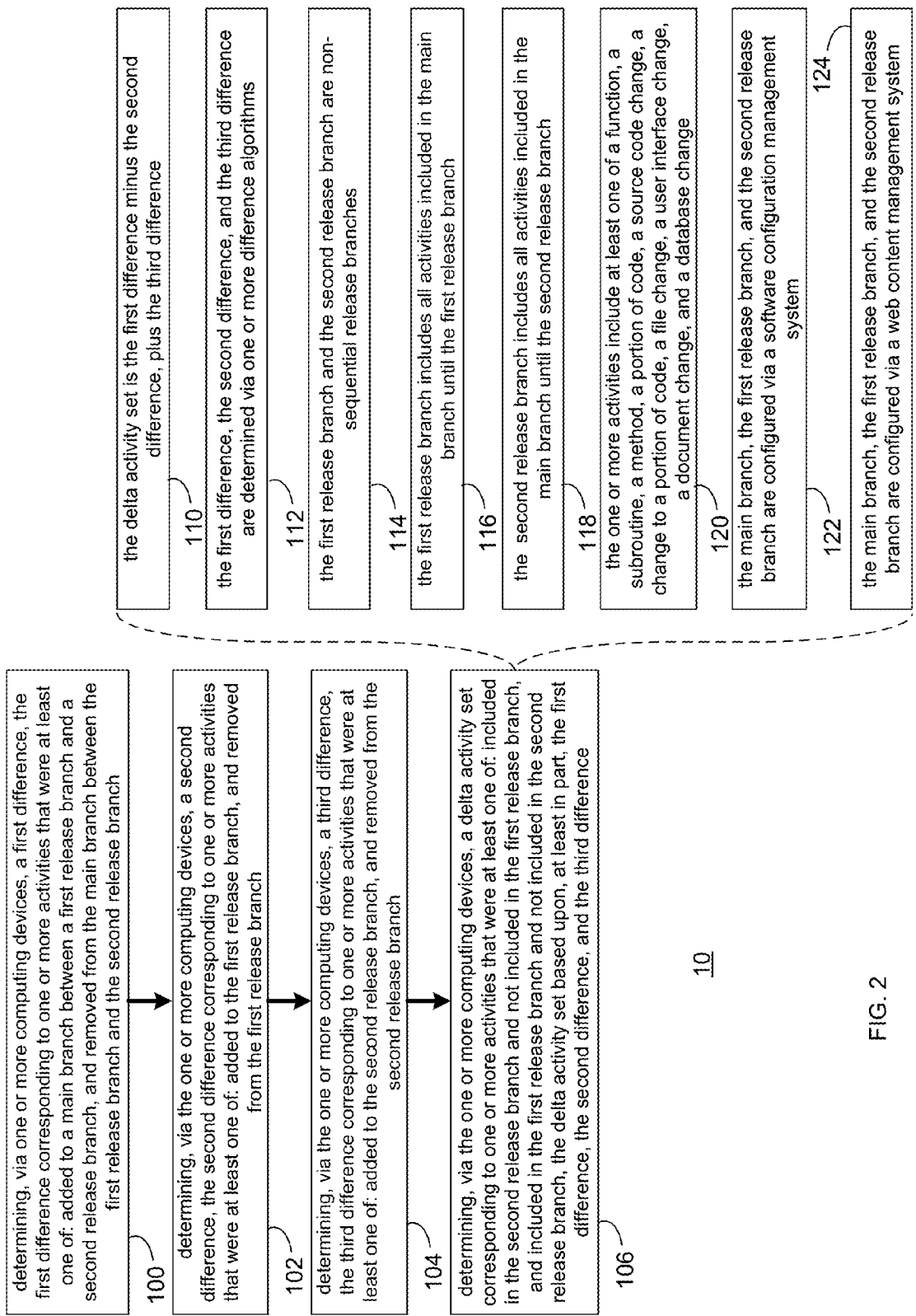
FIG. 2 is a flowchart of the release difference process of FIG. 1.

Referring to FIGS. 1 & 2, there is shown a release difference process 10. As will be discussed below, release difference process 10 may determine 100, a first difference, the first difference corresponding to one or more activities that were at least one of: added to a main branch between a first release branch and a second release branch, and removed from the main branch between the first release branch and the second release branch. Release difference process 10 may also determine 102 a second difference, the second difference corresponding to one or more activities that were at least one of: added to the first release branch, and removed from the first release branch. Release difference process 10 may also determine 104 a third difference, the third difference corresponding to one or more activities that were at least one of: added to the second release branch, and removed from the second release branch. Additionally, release difference process 10 may determine 106 a delta activity set corresponding to one or more activities that were at least one of: included in the second release branch and not included in the first release branch, and included in the first release branch and not included in the second release branch, the delta activity set based upon, at least in part, the first difference, the second difference, and the third difference.

The release difference (RD) process may be a server-side process (e.g., server-side RD process 10), a client-side process (e.g., client-side RD process 12, client-side RD process 14, client-side RD process 16, or client-side RD process 18), or a hybrid server-side/client-side process (e.g., the combination of server-side RD process 10 and one or more of client-side RD processes 12, 14, 16, 18).

Server-side RD process 10 may reside on and may be executed by server computer 20, which may be connected to network 22 (e.g., the Internet or a local area network). Examples of server computer 20 may include, but are not limited to: a personal computer, a server computer, a series of server computers, a mini computer, and/or a mainframe computer. Server computer 20 may be a web server (or a series of servers) running a network operating system, examples of which may include but are not limited to: Microsoft Windows Server; Novell Netware; or Red Hat Linux, for example.

The instruction sets and subroutines of server-side RD process 10, which may be stored on storage device 24 coupled to server computer 20, may be executed by one or more processors (not shown) and one or more memory architectures (not shown) incorporated into server computer 20. Storage device 24 may include but is not limited to: a hard disk drive; a tape drive; an optical drive; a RAID array; a random access memory (RAM); and a read-only memory (ROM).

Server computer 20 may execute a web server application, examples of which may include but are not limited to: Microsoft IIS, Novell Web Server, or Apache Web Server, that allows for access to server computer 20 (via network 22) using one or more protocols, examples of which may include but are not limited to HTTP (i.e., HyperText Transfer Protocol), SIP (i.e., session initiation protocol), and the Lotus® Sametime® VP protocol. Network 22 may be connected to one or more secondary networks (e.g., network 26), examples of which may include but are not limited to: a local area network; a wide area network; or an intranet, for example.

Client-side RD processes 12, 14, 16, 18 may reside on and may be executed by client electronic devices 28, 30, 32, and/or 34 (respectively), examples of which may include but are not limited to personal computer 28, laptop computer 30, a data-enabled mobile telephone 32, notebook computer 34, personal digital assistant (not shown), smart phone (not shown) and a dedicated network device (not shown), for example. Client electronic devices 28, 30, 32, 34 may each be coupled to network 22 and/or network 26 and may each execute an operating system, examples of which may include but are not limited to Microsoft Windows, Microsoft Windows CE, Red Hat Linux, or a custom operating system.

The instruction sets and subroutines of client-side RD processes 12, 14, 16, 18, which may be stored on storage devices 36, 38, 40, 42 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Storage devices 36, 38, 40, 42 may include but are not limited to: hard disk drives; tape drives; optical drives; RAID arrays; random access memories (RAM); read-only memories (ROM); compact flash (CF) storage devices; secure digital (SD) storage devices; and memory stick storage devices.

Client-side RD processes 12, 14, 16, 18 and/or server-side RD process 10 may be processes that run within (i.e., are part of) a software configuration management system and/or application (e.g., IBM® Rational® ClearCase®). Alternatively, client-side RD processes 12, 14, 16, 18 and/or server-side RD process 10 may be stand-alone applications that work in conjunction with the software configuration management system and/or application. One or more of client-side RD processes 12, 14, 16, 18 and server-side RD process 10 may interface with each other (via network 22 and/or network 26).

Users 44, 46, 48, 50 may access server-side RD process 10 directly through the device on which the client-side RD process (e.g., client-side RD processes 12, 14, 16, 18) is executed, namely client electronic devices 28, 30, 32, 34, for example. Users 44, 46, 48, 50 may access server-side RD process 10 directly through network 22 and/or through secondary network 26. Further, server computer 20 (i.e., the computer that executes server-side RD process 10) may be connected to network 22 through secondary network 26, as illustrated with phantom link line 52.

The various client electronic devices may be directly or indirectly coupled to network 22 (or network 26). For example, personal computer 28 is shown directly coupled to network 22 via a hardwired network connection. Further, notebook computer 34 is shown directly coupled to network 26 via a hardwired network connection. Laptop computer 30 is shown wirelessly coupled to network 22 via wireless communication channel 54 established between laptop computer 30 and wireless access point (i.e., WAP) 56, which is shown directly coupled to network 22. WAP 56 may be, for example, an IEEE 802.11a, 802.11b, 802.11g, 802.11n, Wi-Fi, and/or Bluetooth device that is capable of establishing wireless communication channel 54 between laptop computer 30 and WAP 56. Data-enabled mobile telephone 32 is shown wirelessly coupled to network 22 via wireless communication channel 58 established between data-enabled mobile telephone 32 and cellular network/bridge 60, which is shown directly coupled to network 22.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

The Release Difference (RD) Process

For the following discussion, server-side RD process 10 will be described for illustrative purposes. It should be noted that client-side RD process 12 may be incorporated into server-side RD process 10 and may be executed within one or more applications that allow for communication with client-side RD process 12. However, this is not intended to be a limitation of this disclosure, as other configurations are possible (e.g., stand-alone, client-side RD processes and/or stand-alone server-side RD processes.) For example, some implementations may include one or more of client-side RD processes 12, 14, 16, 18 in place of or in addition to server-side RD process 10.

Software and/or web content developers may wish to determine what changes or activities may be included in a release branch or release stream. Further, developers may wish to determine what changes or activities may be included in a release branch or release stream excluding any changes or activities that may have been included in a prior release branch or release stream. Developers may also wish to determine what changes or activities may have been included in a prior release branch or release stream that may not have been included in a subsequent release branch or release stream. Moreover, developers may wish to determine specific changes or activities in a fix-pack or service-pack that may not have been included in a prior fix-pack or service-pack, or determine specific changes or activities that were included in the prior fix-pack or service pack that were not included in a subsequent fix-pack or service pack.

Figure 3:
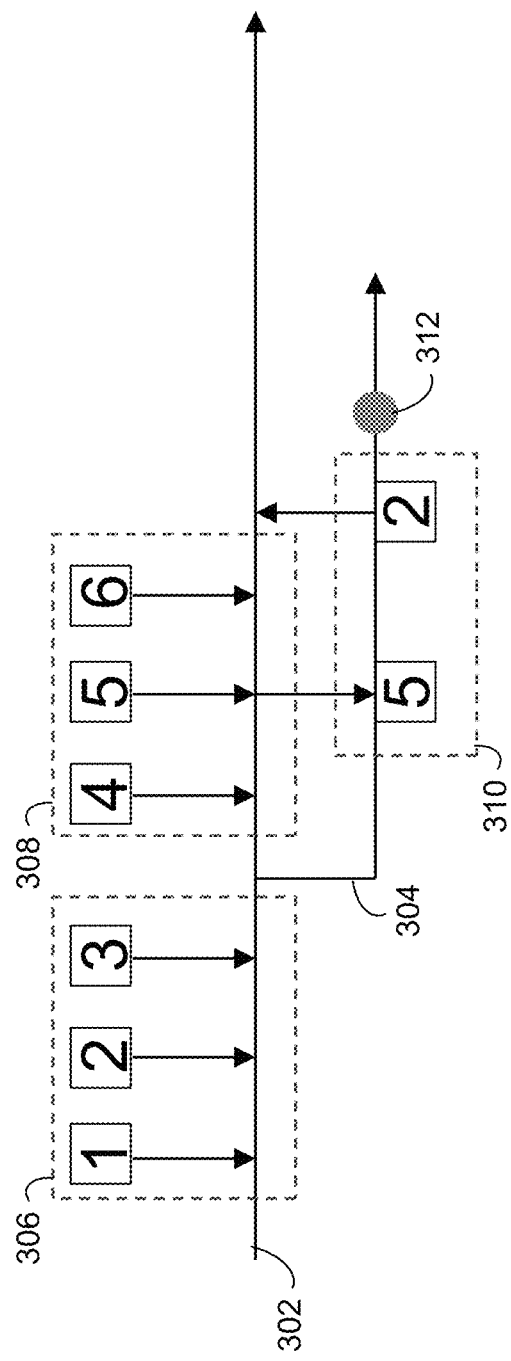
FIGS. 3-7 are exemplary source control systems which may be associated with the release difference process of FIG. 1.

A software project may incorporate a number of release strategies. Referring now to FIGS. 1-3, a release strategy may include adding and/or delivering one or more changes or activities to a main branch, main stream, or trunk (e.g., trunk 302). A release branch (e.g., release branch 304) may be branched off from trunk 302. Release branch 304 may include all changes and/or activities added and/or delivered to trunk 302 prior to release branch 304. For example, activities 306 (e.g., activities 1, 2, and 3) may be included in release branch 304 since activities 306 were added and/or delivered to trunk 302 prior to release branch 304. In other words, release branch 304 may include (116) all activities included in the main branch (e.g., trunk 302) until release branch 304. Activities (e.g., activities 306) may include changes in the software project added to trunk 302. Activities may include (120), but are not limited to, a function, a subroutine, a method, a portion of code, a source code change, a change to a portion of code, a file change, a user interface change, a document change, and a database change.

Continuing with the above example, after release branch 304 is branched out from trunk 302, developers may continue to add and/or deliver activities to trunk 302. As shown FIG. 3, developers may add and/or deliver activities 308 (e.g., activities 4, 5, and 6) to trunk 302 after release branch 304 is branched out from trunk 302. One or more of activities 308 (e.g., activity 5) may subsequently be added to release branch 304. Further, one or more of activities 306 (e.g., activity 2) may subsequently be removed from release branch 304. In other words, activities 310 (e.g., activities 5 and 2) may be added to and/or removed from release branch 304. For example, after release branch 304 is branched out from trunk 302, developers may determine that activity 5, which may be, for example, a portion of code, should be added to release branch 304. Also, after release branch 304 is branched out from trunk 302, developers may determine that activity 2, which may be, for example, a function, is unsatisfactory and should be removed from release branch 304. As such, since activities 1, 2, and 3 were initially included in release branch 304, since activity 5 was added to release branch 304, and since activity 2 was removed from release branch 304, activities 1, 3, and 5 may be released at release point 312 on release branch 304. Release point 312 may be associated with a release of the activities included in release branch 304 prior to release point 312 (e.g., activities 1, 3, and 5) to testers, consumers, or other developers.

Figure 4:
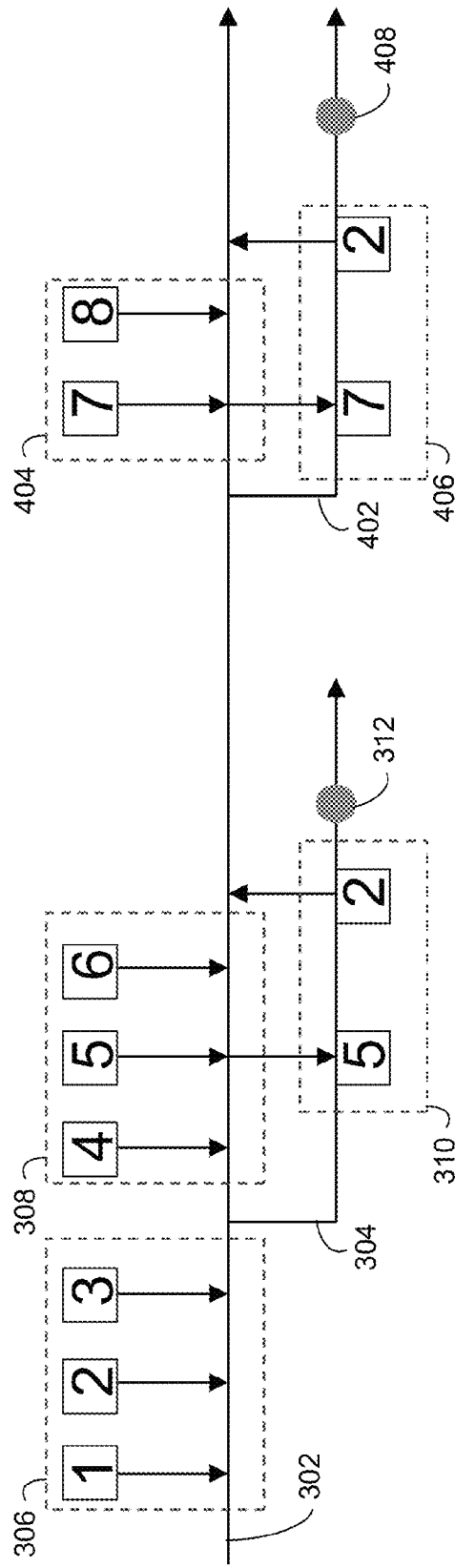

Referring now to FIG. 4, subsequent release branches may be branched out from trunk 302 after release branch 304 and/or release point 312. As shown in FIG. 4, release branch 402 may be branched out from trunk 302. Release branch 402 may include all changes and/or activities added and/or delivered to trunk 302 prior to release branch 402. For example, activities 306 (e.g., activities 1, 2, and 3) and activities 308 (e.g., activities 4, 5, and 6) may be included in release branch 402 since activities 306 and 308 were added and/or delivered to trunk 302 prior to release branch 402. In other words, release branch 402 may include (118) all activities included in the main branch (e.g., trunk 302) until release branch 402. It should be noted that activities may be removed and/or deleted from trunk 302 at any time. For example, activity 3 may be removed (not shown) from trunk 302 after release branch 304, but prior to release branch 402. In this exemplary situation, activity 3 may be included in release branch 304, but may not be included in release branch 402.

Continuing with the above example and referring to FIG. 4, after release branch 402 is branched out from trunk 302, developers may continue to add and/or deliver activities to trunk 302. As shown FIG. 4, developers may add and/or deliver activities 404 (e.g., activities 7 and 8) to trunk 302 after release branch 402 is branched out from trunk 302. One or more of activities 404 (e.g., activity 7) may subsequently be added to release branch 402. Further, one or more of activities 306 and/or 308 (e.g., activity 2) may subsequently be removed from release branch 402. In other words, activities 406 (e.g., activities 7 and 2) may be added to and/or removed from release branch 402. For example, after release branch 402 is branched out from trunk 302, developers may determine that activity 7, which may be, for example, a subroutine, should be added to release branch 402. Also, after release branch 402 is branched out from trunk 302, developers may determine that activity 2, which may be, for example, a user interface or a change to a user interface, is unsatisfactory and should be removed from release branch 402. As such, since activities 1-6 were initially included in release branch 402, since activity 7 was added to release branch 402, and since activity 2 was removed from release branch 402, activities 1, and 3-7 may be released at release point 408 on release branch 402. Release point 408 may be associated with a release of the activities included in release branch 402 prior to release point 408 (e.g., activities 1, and 3-7) to testers, consumers, or other developers.

As discussed above, developers may wish determine what changes or activities may be included in a release branch or release stream (e.g., release branch 402) excluding any changes or activities that may have been included in a prior release branch or release stream (e.g., release branch 304). Developers may also wish to determine what activities may have been included in a prior release branch or release stream (e.g., release branch 304) that may not have been included in a subsequent release branch or release stream (e.g., release branch 402). Manually comparing trunk 302, release branch 304, and release branch 402 may be tedious, time consuming, and prone to error. Further, manual comparison may need to be repeated a number of times if future changes are made to the release stream. As such, an automated process to dynamically and/or automatically determine a delta set of activities with regard to release branches 304 and 402 may be desired.

Figure 5:
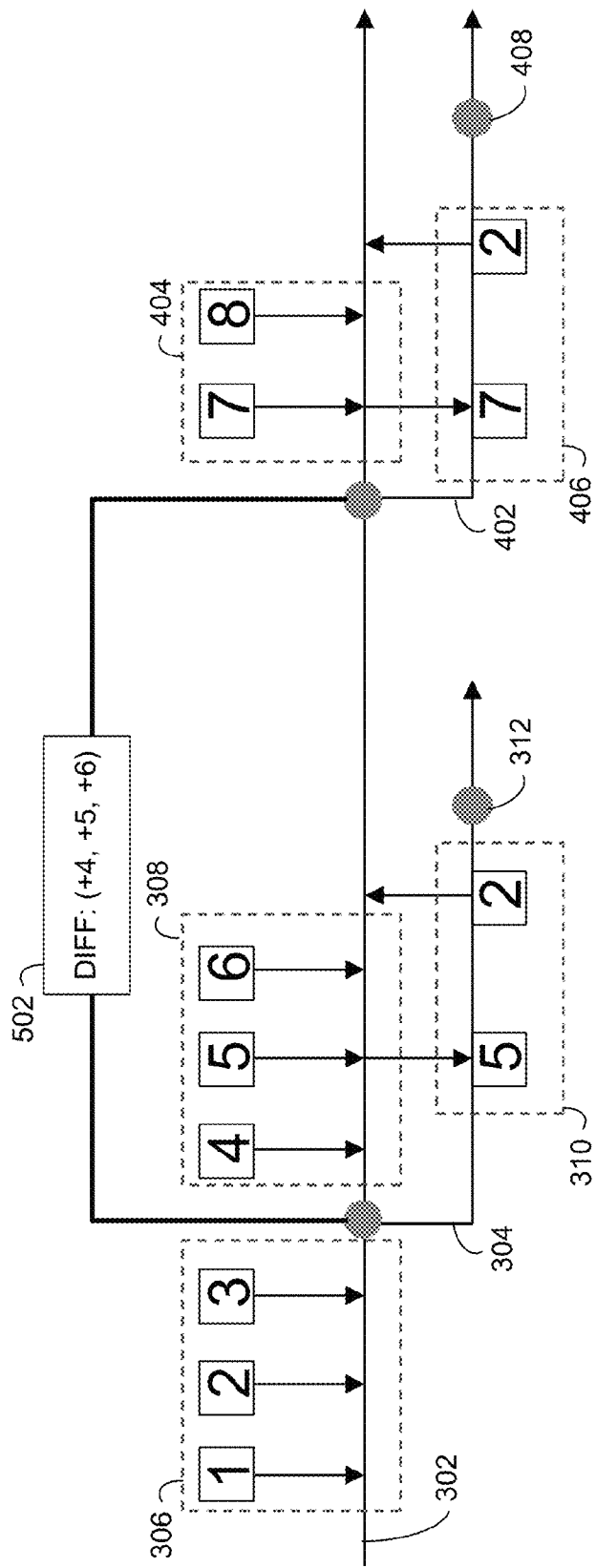

One or more of the RD processes discussed herein may be automated processes for determining a list of changes between two release streams. Referring now also to FIGS. 2 and 5, RD process 10 may determine 100 a first difference (e.g., difference 502) the first difference (e.g., difference 502) corresponding to one or more activities (e.g., activities 308) added to a main branch (e.g., trunk 302) between a first release branch (e.g., release branch 304) and a second release branch (e.g., release branch 402). The first difference (e.g., difference 502) may also correspond to one or more activities (e.g., activities 308) removed (e.g., deleted) from the main branch (e.g., trunk 302) between the first release branch (e.g., release branch 304) and the second release branch (e.g., release branch 402). Difference 502 may be determined (112) via one or more difference algorithms. As shown in FIG. 5, since activities 308 (e.g., activities 4, 5, and 6) were added to trunk 302 between release branch 304 and release branch 402, difference 502 may be (+4, +5, +6). In an example, if activity 3 were removed from trunk 302 between release branch 304 and release branch 402, difference 502 may be (+4, +5, +6, −3).

Figure 6:
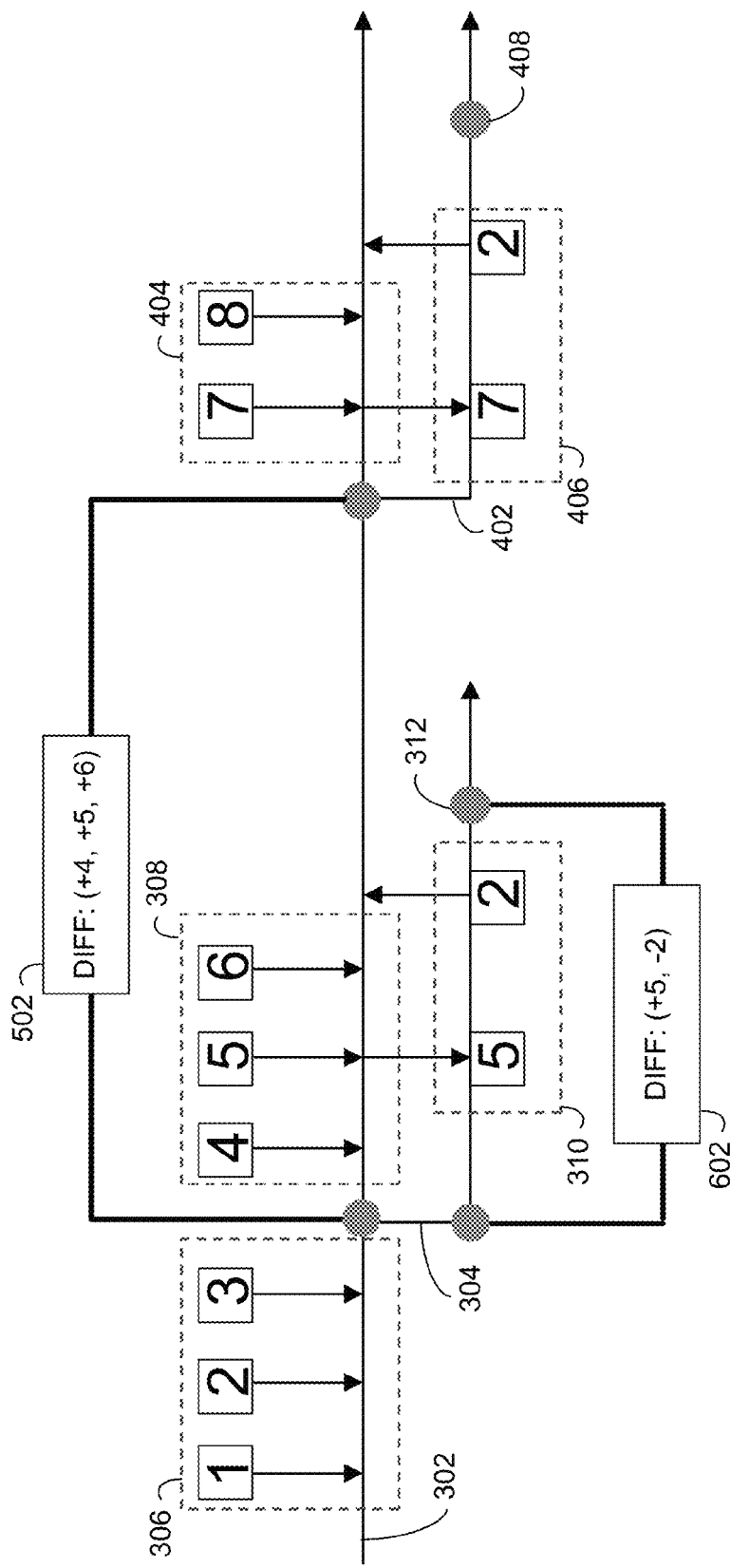

Referring now also to FIG. 6, RD process 10 may further determine 102 a second difference (e.g., difference 602), the second difference (e.g., difference 602) corresponding to one or more activities (e.g., activities 310) that were at least one of: added to the first release branch (e.g., release branch 304), and removed from the first release branch (e.g., release branch 304). Difference 602 may be determined (112) via one or more difference algorithms. As shown in FIG. 6, since activity 5 was added to release branch 304, and since activity 2 was removed from release branch 310, difference 602 may be (+5, −2).

Figure 7:
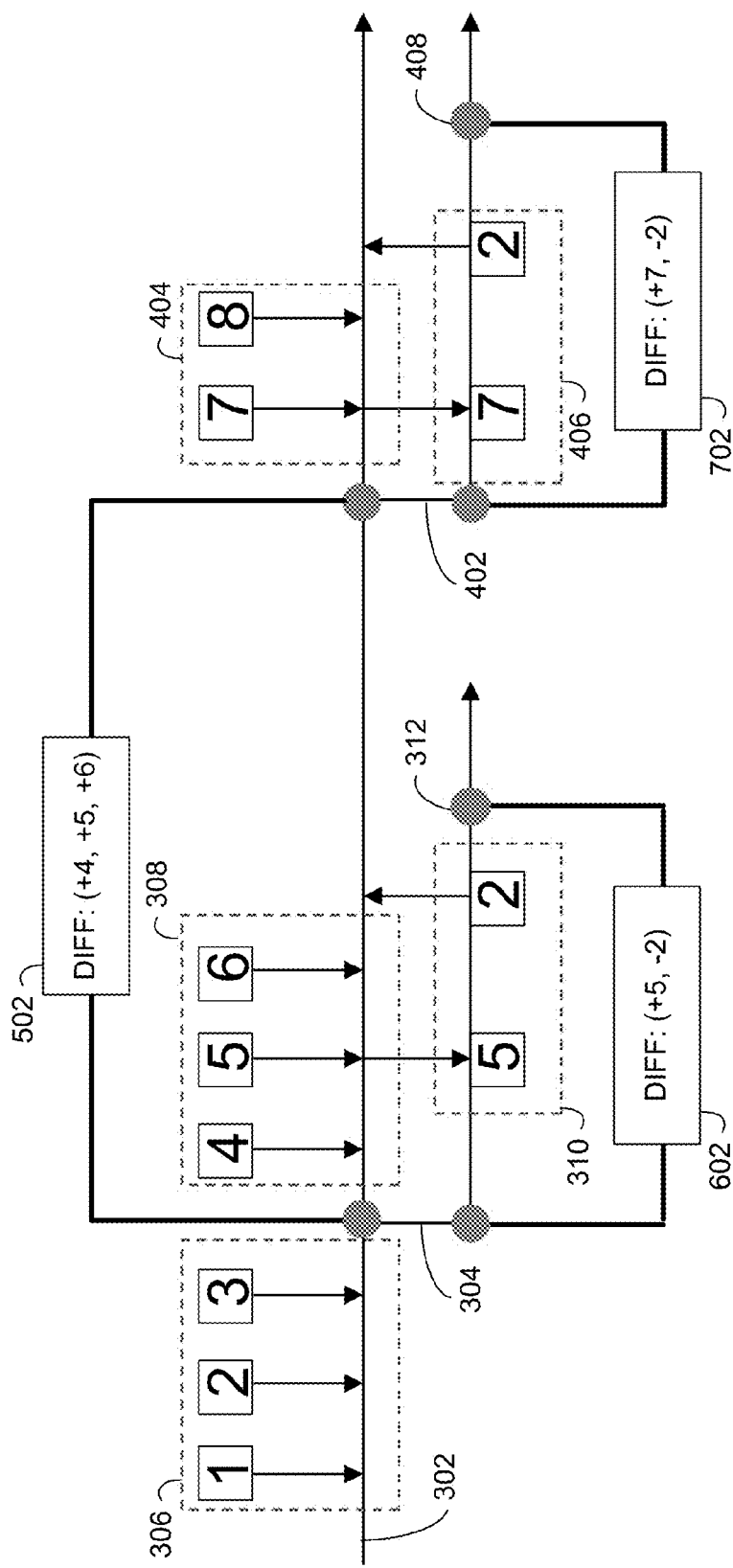

Referring now also to FIG. 7, RD process 10 may additionally determine 104 a third difference (e.g., difference 702), the third difference (e.g., difference 702) corresponding to one or more activities (e.g., activities 406) that were at least one of: added to the second release branch (e.g., release branch 402), and removed from the second release branch (e.g., release branch 402). Difference 702 may be determined (112) via one or more difference algorithms. As shown in FIG. 7, since activity 7 was added to release branch 402, and since activity 2 was removed from release branch 402, difference 702 may be (+7, −2). The one or more difference algorithms (e.g., diff) may be operations that may determine and output the differences between two files. The one or more difference algorithms may be operations included with standard software configuration management systems and/or applications (e.g., IBM® Rational® ClearCase®).

Figure 8:
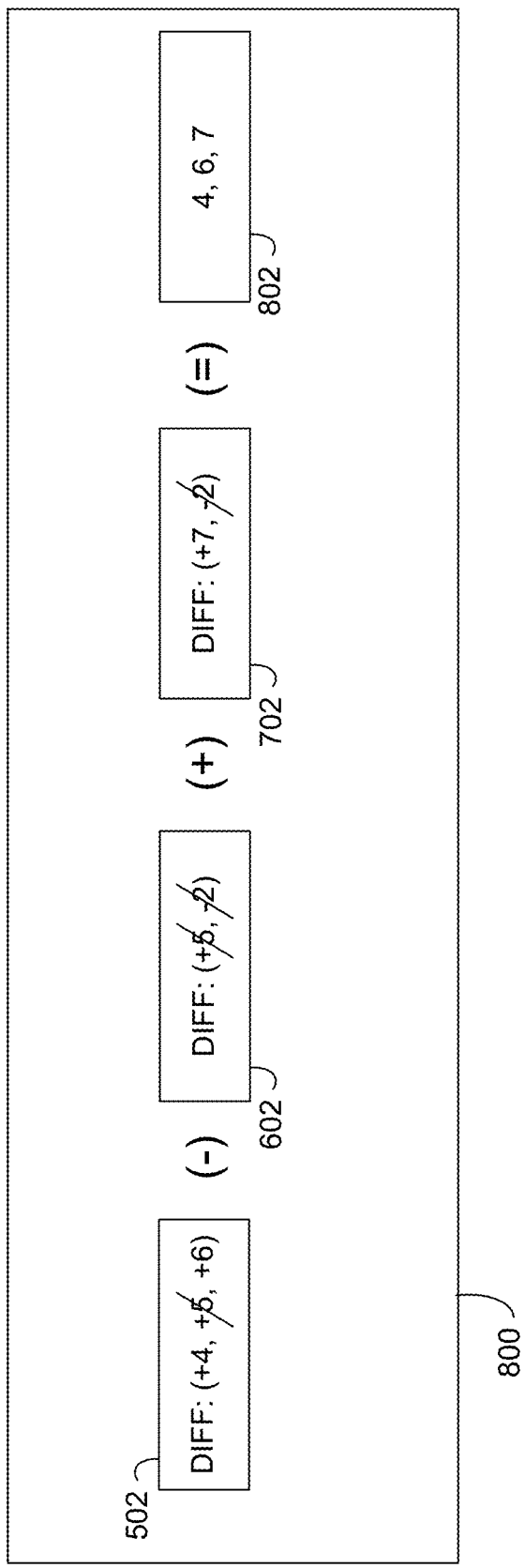
FIG. 8 is also an exemplary calculation which may be associated with the release difference process of FIG. 1.

Referring now also to FIG. 8, RD process 10 may also determine 106 a delta activity set (e.g., delta activity set 802) corresponding to one or more activities (e.g., activities 4, 6, and 7) included in the second release branch (e.g., release branch 402) that were not included in the first release branch (e.g., release branch 304), the delta activity set (e.g., delta activity set 802) based upon, at least in part, the first difference (e.g., difference 502), the second difference (e.g., difference 602), and the third difference (e.g., difference 702). The delta activity set (e.g., delta activity set 802) may also correspond to one or more activities that were included in the first release branch (e.g., release branch 304) but may not have been included in the second release branch (e.g., release branch 402).

For example, since activity 5 was included in both release branches 304 and 402, activity 5 may not be included in delta activity set 802. Further, since activity 2 was not included in either release branches 304 or 402, activity 2 may not be included in delta activity set 802. However, since activities 4, 6, and 7 were included in release branch 402, but were not included in release branch 304, activities 4, 6, and 7 may be included in delta activity set 802. It should be noted that since activities 1 and 3 were included in both release branches 304 and 402, they may not be included in differences 502, 602, or 702, and therefore may not be included in delta activity set 802. Further, since activity 8 was not included in either release branch 304 or 402, it may not be included in differences 502, 602, and 702, and therefore may not be included in delta activity set 802.

Delta activity set 802 may be determined by performing calculation 800, which may be performed, at least in part, by RD process 10. Further, the delta activity set (e.g., delta activity set 802) may be (110) the first difference (e.g., difference 502) minus the second difference (e.g., difference 602), plus the third difference (e.g., difference 702). For example, and as shown in FIG. 8, delta activity set 802 (DAS 802) may be calculated using the formula:

DIFF 502−DIFF 602+DIFF 702=DAS 802 which, in the examples discussed in the present disclosure, may be:

(4,5,6)−(5,−2)+(7,−2)=4,6,7

For illustrative purposes only, assume that activity 3 was removed from trunk 302 between release branch 304 and release branch 402. In this example, difference 502 may be (+4, +5, +6, −3), and RD process 10 may determine (e.g., via calculation 800) the delta activity set to be:

$$(4,5,6,-3)-(5,-2)+(7,-2)=4,6,7,-3$$

In other words, in this example the delta activity set may be 4, 6, 7, −3, which may indicate to a developer that activities 4, 6, and 7 were included in the second release branch (e.g., release branch 402), but were not included in the first release branch (e.g., release branch 304), and also that activity 3 was included in the first release branch (e.g., release branch 304), but was not included in the second release branch (e.g., release branch 402).

It should be noted that the formula above is described for illustrative purposes only, as a number various other formulas may be used to determine and/or calculate delta activity set 802 based upon, at least in part, the one or more difference algorithms used to determine differences 502, 602, and 702, and the input and output formats thereof.

In an embodiment, the first release branch (e.g., release branch 304) and the second release branch (e.g., release branch 402) may be (114) non-sequential release branches. For example, one or more release branches (not shown) may have branched out from trunk 302 between release branch 304 and release branch 402. Regardless of one or more release branches (not shown) being branched out from trunk 302 between release branch 304 and release branch 402, RD process 10 may still use the various operations discussed herein to determine a delta activity set (e.g., delta activity set 802).

Further in an embodiment, the main branch (e.g., trunk 302), the first release branch (e.g., release branch 304), and the second release branch (e.g., release branch 402) may be (122) configured via a software configuration management system (e.g., IBM® Rational® ClearCase®). Also, in an embodiment, the main branch (e.g., trunk 302), the first release branch (e.g., release branch 304), and the second release branch (e.g., release branch 402) may be (124) configured via a web content management system (e.g., IBM® Web Content Manager). In this way developers may use RD process 10 to determine changes that have been made since a website was last updated. Additionally, in an embodiment, one or more delta activity sets determined for pairs of release streams may be stored for and accessed for future use.

As will be appreciated by one skilled in the art, aspects of the present invention may be embodied as a system, apparatus, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer (i.e., a client electronic device), partly on the user's computer, as a stand-alone software package, partly on the user's computer and partly on a remote computer or entirely on the remote computer or server (i.e., a server computer). In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention may be described with reference to flowchart illustrations and/or block diagrams of methods, apparatus (systems) and/or computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures may illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Further, one or more blocks shown in the block diagrams and/or flowchart illustration may not be performed in some implementations or may not be required in some implementations. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A number of embodiments and implementations have been described. Nevertheless, it will be understood that various modifications may be made. Accordingly, other embodiments and implementations are within the scope of the following claims.

What is claimed is:

1. A method comprising:
   determining, via one or more computing devices, a first difference, the first difference corresponding to one or more activities that were at least one of: added to a main branch between a first release branch and a second release branch, and removed from the main branch between the first release branch and the second release branch;
   determining, via the one or more computing devices, a second difference, the second difference corresponding to one or more activities that were at least one of: added to the first release branch, and removed from the first release branch;
   determining, via the one or more computing devices, a third difference, the third difference corresponding to one or more activities that were at least one of: added to the second release branch, and removed from the second release branch; and
   determining, via the one or more computing devices, a delta activity set corresponding to one or more activities that were at least one of: included in the second release branch and not included in the first release branch, and included in the first release branch and not included in the second release branch, the delta activity set based upon, at least in part, the first difference, the second difference, and the third difference.

2. The method of claim 1, wherein the delta activity set is the first difference minus the second difference, plus the third difference.

3. The method of claim 1, wherein the first difference, the second difference, and the third difference are determined via one or more difference algorithms.

4. The method if claim 1, wherein the first release branch and the second release branch are non-sequential release branches.

5. The method of claim 1, wherein the first release branch includes all activities included in the main branch until the first release branch.

6. The method of claim 1, wherein the second release branch includes all activities included in the main branch until the second release branch.

7. The method of claim 1, wherein the one or more activities include at least one of a function, a subroutine, a method, a portion of code, a source code change, a change to a portion of code, a file change, a user interface change, a document change, and a database change.

8. The method of claim 1, wherein the main branch, the first release branch, and the second release branch are configured via a software configuration management system.

9. The method of claim 1, wherein the main branch, the first release branch, and the second release branch are configured via a web content management system.

* * * * *